(12) United States Patent
Meguriya

(10) Patent No.: US 6,506,331 B2
(45) Date of Patent: Jan. 14, 2003

(54) METHOD FOR THE PREPARATION OF LOW SPECIFIC GRAVITY SILICONE RUBBER ELASTOMERS

(75) Inventor: Noriyuki Meguriya, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/785,214

(22) Filed: Feb. 20, 2001

(65) Prior Publication Data

US 2001/0025066 A1 Sep. 27, 2001

(30) Foreign Application Priority Data

Feb. 29, 2000 (JP) .......................... 2000-052917

(51) Int. Cl.⁷ .......................... B29L 35/02; B29L 51/42; C08K 7/22; C08L 83/04
(52) U.S. Cl. .................... 264/327; 264/331.11; 521/51; 521/54; 521/154; 523/218; 523/223; 524/588
(58) Field of Search .................... 521/51, 54, 154; 264/327, 331.11; 523/218, 223; 524/588

(56) References Cited

U.S. PATENT DOCUMENTS

| | | | |
|---|---|---|---|
| 4,580,794 A | * | 4/1986 | Gibbons ..................... 156/329 |
| 5,128,175 A | * | 7/1992 | Yamanishi et al. ......... 264/415 |
| 5,246,973 A | | 9/1993 | Nakamura et al. |
| 5,750,581 A | | 5/1998 | Brennenstuhl et al. |
| 5,910,524 A | * | 6/1999 | Kalinoski ................... 427/387 |
| 5,948,856 A | * | 9/1999 | Juen et al. .................. 523/218 |
| 5,981,610 A | | 11/1999 | Meguriya et al. |
| 6,235,801 B1 | * | 5/2001 | Morales et al. ............. 521/154 |
| 6,261,214 B1 | * | 7/2001 | Meguriya .................... 492/46 |
| 6,297,291 B2 | * | 10/2001 | Tsuji et al. ................. 521/134 |
| 6,319,181 B1 | * | 11/2001 | Naoi et al. .................... 492/56 |
| 6,333,364 B2 | * | 12/2001 | Meguriya et al. ........... 521/134 |
| 2001/0016609 A1 | * | 8/2001 | Meguriya et al. ............ 521/54 |
| 2002/0028736 A1 | * | 3/2002 | Kishino et al. ............... 492/50 |

FOREIGN PATENT DOCUMENTS

| JP | A1060151 | 3/1998 |
|---|---|---|

* cited by examiner

Primary Examiner—Robert Dawson
Assistant Examiner—Jeffrey B. Robertson
(74) Attorney, Agent, or Firm—Birch, Stewart, Kolasch & Birch, LLP

(57) ABSTRACT

The primary curing step of molding a heat curable silicone rubber composition loaded with a hollow filler of organic resin under such conditions that the hollow filler is not broken, is followed by the secondary curing step of curing the molded rubber under such conditions that the hollow filler is broken, thereby producing a low specific gravity silicone rubber elastomer having improved heat resistance and minimized changes with time of physical properties, without operational problems.

13 Claims, 1 Drawing Sheet

METHOD FOR THE PREPARATION OF LOW SPECIFIC GRAVITY SILICONE RUBBER ELASTOMERS

This invention relates to a method for preparing low specific gravity silicone rubber elastomers having heat resistance.

BACKGROUND OF THE INVENTION

Heat curing type liquid silicone rubber compositions are employed in a variety of applications since they are effectively moldable and exhibit good heat resistance, weather resistance and electrical insulation after molding. On the other hand, silicone rubber sponge is lightweight while maintaining the heat resistance, weather resistance, and electrical insulation inherent to silicone rubber. By virtue of the inclusion of gas in the molded part, the silicone rubber sponge serves the function of a shock absorber or cushioning member by utilizing its volume contraction and the function of a thermal insulating or thermal storage material by utilizing its low heat transfer, finding a wide variety of applications.

Such silicone rubber sponges are obtained by several methods, for example, by adding a thermally decomposable blowing agent, or by molding and curing while generating hydrogen gas by-product. In the method of adding a thermally decomposable blowing agent, the toxicity and odor of decomposed gases are problems. In the system wherein a platinum catalyst is used as the curing catalyst, the retardation of cure by the blowing agent is a problem. The method of utilizing hydrogen gas by-produced during the curing step suffers from such problems as the potential explosion of hydrogen gas and the careful handling of uncured composition during shelf storage. Further, the gas generating method encounters difficulty in forming controlled uniform cells particularly when the silicone rubber composition is a liquid one. One known approach addressing the above-mentioned problems is to incorporate hollow particles of inorganic material, typically glass or ceramic material into rubber. This method provides only a little contribution to weight reduction because of the high specific gravity and achieves only a little thermal conductivity decline because of the inorganic nature. It is also known to add a hollow filler of organic resin. Because of the poor heat resistance of the organic resin filler, the physical properties of molded parts largely vary with the lapse of time in the above-mentioned applications, failing to take advantage of the heat resistance of silicone rubber.

SUMMARY OF THE INVENTION

An object of the invention is to provide a simple method for preparing a low specific gravity silicone rubber elastomer or spongy silicone rubber having improved heat resistance, without giving rise to handling and other problems.

We have found that when a heat curable silicone rubber composition loaded with a hollow filler of organic resin is molded under such conditions that the hollow filler is not broken, and in the subsequent secondary curing step, the hollow filler is broken, there is obtained a low specific gravity silicone rubber elastomer having improved heat resistance. Since the silicone rubber is produced in the sponge state, the invention avoids changes of physical properties during service due to breakage of the hollow filler. The advantage becomes more outstanding when the composition is molded at a temperature below the softening point of the organic resin, and the hollow filler is broken in the secondary curing step which is effected at a temperature equal to or above the softening point of the organic resin; or when the composition is molded within 14 minutes at a temperature from the softening point of the organic resin to the softening point plus 20° C., and the hollow filler is broken in the secondary curing step which is effected for at least 15 minutes at a temperature equal to or above the softening point of the organic resin.

DESCRIPTION OF THE PREFERRED EMBODIMENT

Figure 1:
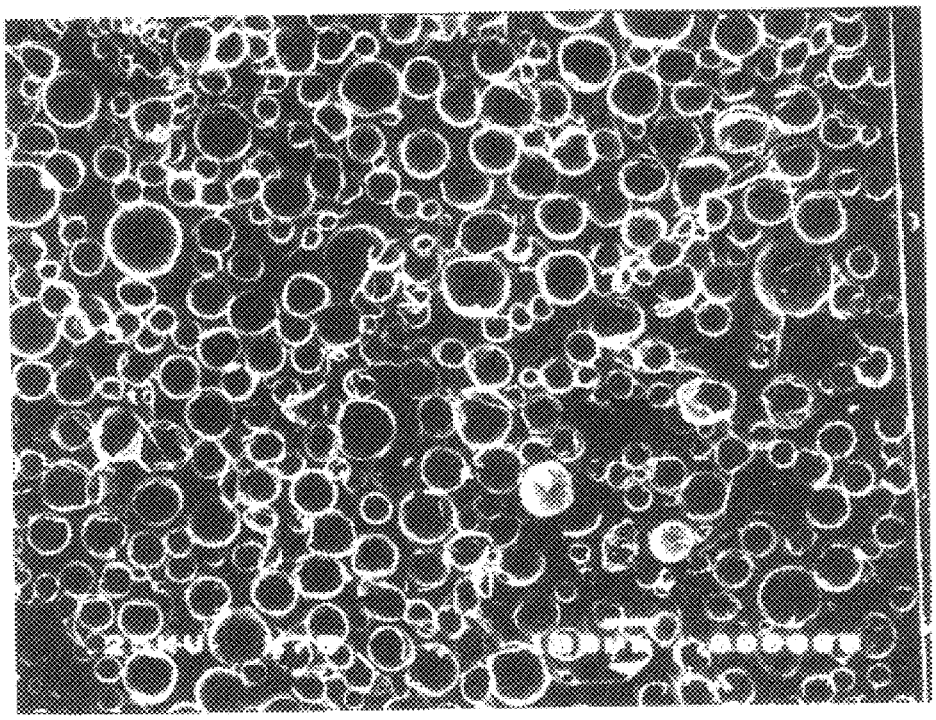
FIG. 1 is a photomicrograph of the silicone rubber sample after post curing in Example 2.

In the method of preparing a low specific gravity silicone rubber elastomer according to the invention, a heat curable silicone rubber composition containing a hollow filler of organic resin is molded under such conditions that the hollow filler is not broken (the molding step serving as primary curing), and the hollow filler is broken in the subsequent secondary curing step.

In one preferred embodiment, after the composition is molded at a temperature below the softening point of the organic resin, the secondary curing step is effected at a temperature equal to or above the softening point of the organic resin. Alternatively, after the composition is molded within 14 minutes at a temperature between the softening point of the organic resin and the softening point plus 20° C., the secondary curing step is effected for at least 15 minutes at a temperature equal to or above the softening point of the organic resin.

The heat curable silicone rubber composition may be either an addition curing type organopolysiloxane composition or a peroxide curing type organopolysiloxane composition.

The addition curing type organopolysiloxane composition is preferably defined as primarily comprising (1) 100 parts by weight of an organopolysiloxane having at least two alkenyl groups attached to silicon atoms in a molecule, (2) 0.1 to 50 parts by weight of an organohydrogenpolysiloxane having at least two, preferably at least three hydrogen atoms attached to silicon atoms (i.e., SiH groups) in a molecule, and (3) a catalytic amount of an addition reaction catalyst.

The peroxide curing type organopolysiloxane composition is preferably defined as primarily comprising (1) 100 parts by weight of an organopolysiloxane having at least two alkenyl groups attached to silicon atoms in a molecule, and (4) a catalytic amount of an organic peroxide.

In the addition curing type organopolysiloxane composition, the organopolysiloxane having at least two alkenyl groups as component (1) is typically represented by the following average compositional formula (1):

$$R^1{}_a SiO_{(4-a)/2} \qquad (1)$$

wherein $R^1$, which may be the same or different, is a substituted or unsubstituted monovalent hydrocarbon group of 1 to 10 carbon atoms, preferably 1 to 8 carbon atoms, and "a" is a positive number of 1.5 to 2.8, preferably 1.8 to 2.5, and more preferably 1.95 to 2.05.

Examples of the substituted or unsubstituted monovalent hydrocarbon groups attached to silicon atoms, represented by $R^1$, include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted ones of the foregoing groups in which some or all of the hydrogen atoms are replaced by halogen atoms (e.g., fluoro, bromo and chloro), cyano groups or the like, such as chloromethyl, chloropropyl, bromoethyl, trifluoropropyl and cyanoethyl.

At least two of the $R^1$ groups must be alkenyl groups, preferably of 2 to 8 carbon atoms, more preferably 2 to 6 carbon atoms. It is noted that the content of alkenyl groups is preferably 0.001 to 20 mol %, especially 0.01 to 10 mol % based on the entire organic groups $R^1$. The alkenyl groups may be attached to silicon atoms at ends of the molecular chain and/or silicon atoms midway the molecular chain.

With respect to the structure, the organopolysiloxane is generally a diorganopolysiloxane of a basically straight chain structure whose backbone is comprised of recurring diorganosiloxane units and which is blocked with a triorganosiloxy group at either end of the molecular chain. However, it may have a partially branched or cyclic structure. The alkenyl group-containing organopolysiloxane may have any desired molecular weight or viscosity, and encompasses from ones having a low viscosity which are liquid at room temperature to gum-like ones having a high viscosity. In order for the organopolysiloxane to cure into a rubbery elastomer, it should preferably have a viscosity at 25° C. of at least 100 centipoise, often 100 to 10,000,000 centipoise, and especially about 500 to 1,000,000 centipoise.

The addition curing type organopolysiloxane composition contains the organohydrogenpolysiloxane (2) and the addition reaction catalyst (3) along with the alkenyl group-containing organopolysiloxane (1). The organohydrogenpolysiloxane (2) acts as a curing agent for the alkenyl group-containing organopolysiloxane (1). The hydrogen atoms bonded to silicon atoms (i.e., SiH groups) of the organohydrogenpolysiloxane are addition reacted (hydrosilylated) with the alkenyl groups of the alkenyl group-containing organopolysiloxane in the presence of the addition reaction catalyst, thereby crosslinking or curing the organopolysiloxane composition. The organohydrogenpolysiloxane (2) is typically represented by the following average compositional formula (2):

$$R^2_b H_c SiO_{(4-b-c)/2} \qquad (2)$$

wherein $R^2$ is a substituted or unsubstituted monovalent hydrocarbon group of 1 to 10 carbon atoms, the letter b is a positive number of 0.7 to 2.1, c is a positive number of 0.001 to 1.0, and b+c is 0.8 to 3.0.

Herein $R^2$ is a substituted or unsubstituted monovalent hydrocarbon group of 1 to 10 carbon atoms, preferably 1 to 8 carbon atoms, examples of which are as described for $R^1$ in formula (1), and preferably those free of aliphatic unsaturation. Preferred groups are alkyl, aryl, aralkyl, and substituted alkyl groups, and specifically methyl, ethyl, propyl, phenyl and 3,3,3-trifluoropropyl. The letter b is a positive number from 0.7 to 2.1, and preferably from 1 to 2, c is a positive number from 0.001 to 1.0, and preferably from 0.01 to 1.0, and b+c is from 0.8 to 3.0, and preferably from 1 to 2.4.

The molecular structure of organohydrogenpolysiloxane may be straight, cyclic, branched or three-dimensional network. SiH groups (i.e., hydrogen atoms attached to silicon atoms) may be positioned at ends and/or midway of the molecular chain. The molecular weight is not critical although a viscosity at 25° C. of 0.5 to 1,000 centipoise, and especially 3 to 500 centipoise is preferred. The number of SiH groups per molecule should be at least two, preferably at least three and preferably up to 200, more preferably up to 100.

Exemplary organohydrogenpolysiloxanes (2) include 1,1,3,3-tetramethyldisiloxane, methylhydrogencyclopolysiloxane, methylhydrogensiloxane-dimethylsiloxane cyclic copolymers, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, copolymers of $(CH_3)_2HSiO_{1/2}$ units and $SiO_{4/2}$ units, copolymers of $(CH_3)_2HSiO_{1/2}$ units, $(CH_3)_3SiO_{1/2}$ units, and $SiO_{4/2}$ units, and copolymers of $(CH_3)_2HSiO_{1/2}$ units, $SiO_{4/2}$ units, and $(C_6H_5)_3SiO_{1/2}$ units.

The organohydrogenpolysiloxane (2) is blended in an amount of 0.1 to 50 parts, preferably 0.3 to 30 parts by weight per 100 parts by weight of the alkenyl-containing organopolysiloxane or base polymer (1). Differently stated, the organohydrogenpolysiloxane (2) is blended in such amounts that the ratio of the number of silicon atom-attached hydrogen atoms (SiH groups) in component (2) to the number of silicon atom-attached alkenyl groups in component (1) is from 0.4:1 to 4:1 and preferably from 0.8:1 to 3:1.

Typical of the addition reaction catalyst (3) are platinum group metal catalysts including platinum group metals in element, compound and complex forms. Included are platinum catalysts, for example, platinum black, platinic chloride, chloroplatinic acid, reaction products of chloroplatinic acid with monohydric alcohols, complexes of chloroplatinic acid with olefins, and platinum bisaceto-acetate; palladium catalysts, for example, tetrakis-(triphenylphosphine)palladium and dichlorobis(triphenylphosphine)palladium; and rhodium catalysts, for example, chlorotris(triphenylphosphine)rhodium and tetrakis-(triphenylphosphine)rhodium. The addition reaction catalyst (3) is used in a catalytic amount, typically about 0.1 to 1,000 parts, preferably about 1 to 200 parts by weight of platinum group metal per million parts by weight of the alkenyl-containing organopolysiloxane (1) and the organohydrogenpolysiloxane (2) combined. Less than 0.1 ppm of the catalyst is often ineffective for promoting cure whereas more than 1,000 ppm of the catalyst adds to the cost.

The peroxide curing type organopolysiloxane composition contains as main components the alkenyl-containing organopolysiloxane (1) described above and the organic peroxide (4) as a curing catalyst.

The organic peroxide (4) used herein may be selected from conventional well-known ones, for example, benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butyl peroxide, t-butyl perbenzoate, 1,1-bis(t-butylperoxy)-3,3,5-trimethylcyclohexane, and 1,6-bis(t-butylperoxy-carboxy) hexane.

The organic peroxide is used in a catalytic amount, usually of 0.01 to 10 parts by weight per 100 parts by weight of the organopolysiloxane (1).

In the silicone rubber composition mentioned above, other components may be blended if desired. Such additional components include fillers, for example, finely divided silica (which may be surface treated with organosilicon compounds if desired) such as fumed silica, precipitated silica, fused silica, ground silica, crystalline silica and spherical silica obtained by the sol-gel method, and calcium carbonate; reinforcing fillers such as silicone resins; conductive agents such as carbon black, conductive zinc white and metal powders; hydrosilylation reaction regulators such as nitrogenous compounds, acetylene compounds, phosphorus compounds, nitrile compounds, carboxylates, tin compounds, mercury compounds and sulfur compounds; heat resistance improvers such as iron oxide and cerium oxide; internal parting agents such as dimethylsilicone fluid; tackifiers; and thixotropic agents.

Further formulated in the heat curable silicone rubber composition of the invention is a hollow filler of organic resin. The hollow filler is a solid shell (shell of organic resin) encapsulating a gas and serves to reduce the specific gravity of the material having the filler incorporated therein, like sponge rubber. Typical hollow fillers are phenolic resin balloons, acrylonitrile resin balloons and vinylidene chloride resin balloons. From the standpoints of weight reduction, the elasticity of balloons themselves (leading to the cushioning property or impact resistance of the rubber having the balloons incorporated therein) and low heat transfer, the filler material is preferably a polymer of a monomer or a copolymer of at least two monomers selected from among vinylidene chloride, acrylonitrile, methacrylonitrile, acrylates, and mechacrylates. An inorganic filler may be applied to the surface of the hollow filler for the purpose of increasing the strength of the hollow filler.

In order that the hollow filler possess the function of reducing the specific gravity and heat conductivity of the silicone rubber composition, the hollow filler should preferably have a true specific gravity of 0.01 to 0.5, and more preferably 0.01 to 0.3. A filler with a true specific gravity of less than 0.01 may be awkward to handle and blend, and result in a hollow filler having an insufficient strength to withstand pressure so that the hollow filler collapses during molding or primary curing, failing to achieve weight reduction. If the filler has a true specific gravity of more than 0.5, the specific gravity of the silicone rubber is not fully reduced. The hollow filler should preferably have a mean particle size of up to 200 $\mu$m. more preferably 10 to 200 $\mu$m, most preferably 10 to 150 $\mu$m. A hollow filler larger than 200 $\mu$m can be destroyed by the pressure during molding or primary curing, resulting in a higher specific gravity and a loss of durability. The mean particle size can be determined as a weight average value (or median diameter) by means of a particle size distribution meter using laser light diffractometry and similar analysis means. The hollow filler preferably has a softening point of 100 to 200° C., and more preferably 120 to 180° C. A hollow filler with a softening point below 100° C. may fail to maintain the balloon shape during molding and lack shape stability during storage. A hollow filler with a softening point above 200° C. may have a substantial influence on the rubber when it is broken by secondary curing. The organic resin hollow filler expanded to a desired particle size and specific gravity is commercially available, for example, under the trade name of Expancel DE series from Expancel and Microsphere series from Matsumoto Yushi K.K.

The amount of the filler blended is preferably 0.1 to 20 parts by weight per 100 parts by weight of the organopolysiloxane composition and is such that the filler accounts for 10 to 80% by volume of the entire composition. With less than 10% by volume, there may be achieved less reductions of specific gravity and heat conductivity. With more than 80% by volume, molding and blending may become difficult, and the molded part become a brittle one lacking rubbery elasticity.

According to the invention, the heat curable silicone rubber composition containing the hollow filler of organic resin is molded (primary curing) under such conditions that the hollow filler is not broken. In the subsequent secondary curing step, the hollow filler is broken. There is obtained a low specific gravity silicone rubber elastomer which has improved heat resistance and experiences minimized changes with time of its physical properties (specific gravity, hardness, etc.) under heated conditions. Typically the silicone rubber elastomer has a specific gravity of less than 1.0, preferably up to 0.9, and especially up to 0.8. Both the molding or primary curing step and the post curing or secondary curing step may be conducted in a conventional manner. The molding conditions under which the organic resin hollow filler is not broken are arrived at, for example, by conducting molding or primary curing at a temperature below the softening point of the organic resin, preferably a temperature lower than the softening point by at least 5° C., and more preferably a temperature lower than the softening point by at least 10° C. The molding time in this embodiment is not critical and is generally within about 120 minutes, and preferably from about 10 seconds to about 30 minutes. In an alternative embodiment, the molding step is effected within 14 minutes (for example, 5 seconds to 14 minutes), preferably within 10 minutes (for example, 10 seconds to 10 minutes), at a temperature between the softening point of the organic resin and the softening point plus 20° C., preferably between the softening point and the softening point plus 10° C. In either embodiment, the molding pressure is preferably up to about 50 N/mm$^2$, especially up to about 20 N/mm$^2$, and the lower limit of molding temperature is at least 60° C., preferably at least 80° C.

The post curing conditions under which the organic resin hollow filler is broken are arrived at, for example, by effecting the secondary curing step at a temperature equal to or above the softening point of the organic resin preferably a temperature higher than the softening point by at least 10° C., more preferably by at least 20° C. The post curing time in this embodiment is not critical although it is usually at least 10 minutes, for example, about 15 minutes to about 100 hours, and more preferably about 20 minutes to about 50 hours. The upper limit of secondary curing temperature is up to 280° C., preferably up to 250° C.

It is noted that the softening point or temperature of the organic resin of which the shell of the hollow filler is made is measured by the following method. An organic resin hollow filler is held for 15 minutes in an oven or thermostat tank which is heated from room temperature (25° C.) to a predetermined temperature, and thereafter cooled down to room temperature (25° C.) again. The softening point is the lowest temperature at which the mean particle size of the hollow filler after the holding in the oven reduces or contracts 20% or more from the initial mean particle size (prior to the holding in the oven). The mean particle size before and after the holding in the oven is a number average of the diameters of at least 100 particles (usually about 100 to 200 particles) measured on an electron photomicrograph.

If the organic resin hollow filler is broken in the molding or primary curing step, the resulting silicone elastomer may not have a low specific gravity of less than 1.0, especially up to 0.9 and a low heat conductivity. If the organic resin hollow filler is not fully broken in the post curing or secondary curing step, the resulting silicone elastomer may experience substantial changes of physical properties with the lapse of time and have a poor heat resistance.

EXAMPLE

Examples of the invention are given below by way of illustration and not by way of limitation. All parts and percents are by weight.

Example 1

In a mixer, 68 parts of a dimethylpolysiloxane (1) blocked with a dimethylvinylsiloxy group at each end of its molecular chain and having a viscosity of 10,000 centipoise at 25° C., 32 parts of fumed silica having a specific surface area of 200 m$^2$/g (Aerosil 200 by Nippon Aerosil K.K.), 5 parts of hexamethyldisilazane, 0.5 part of divinyltetramethyldisilazane, and 2.0 parts of water were mixed for 30 minutes at room temperature, heated at 150° C., agitated at the temperature for 3 hours, and cooled, obtaining a silicone rubber base. In a planetary mixer, 50 parts of the silicone rubber base, 50 parts of a dimethylpolysiloxane (2) blocked with a dimethylvinylsiloxy group at each end of its molecular chain and having a viscosity of 1,000 centipoise at 25° C., and 2 parts (corresponding to 34% by volume based on the entire composition) of a thermoplastic resin hollow filler (microspheres) having a specific gravity of 0.04, a mean particle size of 40 μm and a softening point of about 150° C. (Expancel 551DE by Expancel) were agitated for 30 minutes. Then 3.5 parts of a methylhydrogenpolysiloxane (3) having Si—H groups at both ends and side chains (having a degree of polymerization of 17 and a Si—H content of 0.0060 mol/g) as a crosslinking agent, and 0.05 part of ethynyl cyclohexanol as a reaction regulator were added. Agitation was continued for 15 minutes, yielding a silicone rubber composition. With 0.1 part of a platinum catalyst (Pt concentration 1%) added, the silicone rubber composition was pressed cured at a molding pressure of 8 N/mm$^2$ and 120° C. for 10 minutes into a sheet of 2 mm thick. It was post cured in an oven at 180° C. for 2 hours. The silicone rubber was measured for specific gravity and hardness according to JIS K-6249. A heat resistance test was carried out on the sample in an oven at 200° C., and the specific gravity and hardness were measured after 2, 10, 30 and 100 hours. The results are shown in Table 1.

Example 2

In a mixer, 65 parts of the dimethylpolysiloxane (1) used in Example 1, 35 parts of fumed silica having a specific surface area of 300 m$^2$/g (Aerosil 300 by Nippon Aerosil K.K.), 6 parts of hexamethyldisilazane, 0.5 part of divinyltetramethyldisilazane, and 2.0 parts of water were mixed for 30 minutes at room temperature, heated at 150° C., agitated at the temperature for 3 hours, and cooled, obtaining a silicone rubber base. In a planetary mixer, 50 parts of the silicone rubber base, 50 parts of a dimethylpolysiloxane (4) blocked with a dimethylvinylsiloxy group at each end of its molecular chain and having a viscosity of 100,000 centipoise at 25° C., and 1.2 parts (corresponding to 39% by volume based on the entire composition) of a thermo-plastic resin hollow filler having a specific gravity of 0.02, a mean particle size of 90 μm and a softening point of about 140° C. (Microsphere F-80ED by Matsumoto Yushi K.K.) were agitated for 30 minutes. Then 2.0 parts of a methyl-hydrogenpolysiloxane (3) having Si—H groups at both ends and side chains (having a degree of polymerization of 17 and a Si—H content of 0.0060 mol/g) as a crosslinking agent, 0.05 part of ethynyl cyclohexanol as a reaction regulator and 0.1 part of polyethylene glycol were added. Agitation was continued for 15 minutes, yielding a silicone rubber composition. As in Example 1, the silicone rubber composition, with 0.1 part of a platinum catalyst (Pt concentration 1%) added, was press cured and post cured into a sheet of 2 mm thick, and the silicone rubber measured for specific gravity, hardness and heat resistance. The results are shown in Table 1.

Example 3

In a mixer, 70 parts of the dimethylpolysiloxane (1) used in Example 1, 30 parts of precipitated silica having a specific surface area of 200 m$^2$/g (Nipsil LP by Nippon Silica Industry K.K.), 3 parts of hexamethyldisilazane, 0.5 part of divinyltetramethyldisilazane, and 1.0 part of water were mixed for 30 minutes at room temperature, heated at 150° C., agitated at the temperature for 3 hours, and cooled, obtaining a silicone rubber base. In a planetary mixer, 70 parts of the silicone rubber base, 30 parts of the dimethylpolysiloxane (2) used in Example 1, and 3.0 parts (corresponding to 62% by volume based on the entire composition) of the thermoplastic resin hollow filler (Microsphere F-80ED by Matsumoto Yushi K.K.) used in Example 2 were agitated for 30 minutes. Then 3.2 parts of a methyl-hydrogenpolysiloxane (3) having Si—H groups at both ends and side chains (having a degree of polymerization of 17 and a Si—H content of 0.0060 mol/g) as a crosslinking agent and 0.05 part of ethynyl cyclohexanol as a reaction regulator were added. Agitation was continued for 15 minutes, yielding a silicone rubber composition. As in Example 1, the silicone rubber composition, with 0.1 part of a platinum catalyst (Pt concentration 1%) added, was press cured and post cured into a sheet of 2 mm thick, and the silicone rubber measured for specific gravity, hardness and heat resistance. The results are shown in Table 1.

Example 4

In a planetary mixer, 92 parts of the dimethylpolysiloxane (1) used in Example 1, 8 parts of hydrophobicized fumed silica having a specific surface area of 110 m$^2$/g (Aerosil R-972 by Nippon Aerosil K.K.), and 2.5 parts (corresponding to 59% by volume based on the entire composition) of a thermoplastic resin hollow filler having a specific gravity of 0.018, a mean particle size of 100 μm and a softening point of about 150° C. (Microsphere F-100ED by Matsumoto Yushi K.K.) were agitated for 30 minutes. Then 2.0 parts of a methylhydrogenpolysiloxane (3) having Si—H groups at both ends and side chains (having a degree of polymerization of 17 and a Si—H content of 0.0060 mol/g) as a crosslinking agent, 0.05 part of ethynyl cyclohexanol as a reaction regulator and 0.2 part of polyethylene oxide were added to the mixture, which was mixed for 15 minutes, yielding a silicone rubber composition. As in Example 1, the silicone rubber composition, with 0.1 part of a platinum catalyst (Pt concentration 1%) added, was press cured and post cured into a sheet of 2 mm thick, and the silicone rubber measured for specific gravity, hardness and heat resistance. The results are shown in Table 1.

Example 5

In a planetary mixer, 92 parts of the dimethylpolysiloxane (1) used in Example 1, 8 parts of hydrophobicized fumed silica having a specific surface area of 110 m$^2$/g (Aerosil R-972 by Nippon Aerosil K.K.), and 13 parts (corresponding to 51% by volume based on the entire composition) of a calcium carbonate surface-coated thermoplastic resin hollow filler having a specific gravity of 0.13, a mean particle size of 100 μm and a softening point of about 160° C. (Microsphere MFL-100CA by Matsumoto Yushi K.K.) were agitated for 30 minutes. Then 2.0 parts of a methylhydrogenpolysiloxane (3) having Si—H groups at both ends and side chains (having a degree of polymerization of 17 and a Si—H content of 0.0060 mol/g) as a crosslinking agent, 0.05 part of ethynyl cyclohexanol as a reaction regulator and 0.2 part of polyethylene oxide were added to the mixture, which was mixed for 15 minutes, yielding a silicone rubber composition. As in Example 1, the silicone rubber composition, with 0.1 part of a platinum catalyst (Pt concentration 1%) added, was press cured and post cured into a sheet of 2 mm thick, and the silicone rubber measured for specific gravity, hardness and heat resistance. The results are shown in Table 1.

Example 6

In a planetary mixer, 92 parts of a dimethylpolysiloxane (5) blocked with a trivinylsiloxy group at each end of its molecular chain and having a viscosity of 10,000 centipoise at 25° C., 10 parts of hydrophobicized fumed silica having a specific surface area of 110 m²/g (Aerosil R-972 by Nippon Aerosil K.K.), and 2.5 parts (corresponding to 59% by volume based on the entire composition) of a thermoplastic resin hollow filler having a specific gravity of 0.018, a mean particle size of 100 μm and a softening point of about 150° C. (Microsphere F-100ED by Matsumoto Yushi K.K.) were agitated for 30 minutes. Then 1.0 part of t-butylperoxyisopropyl monocarbonate (Perbutyl I by NOF K.K.) was added to the mixture, which was mixed for 15 minutes, yielding a silicone rubber composition. As in Example 1, the silicone rubber composition was press cured and post cured into a sheet of 2 mm thick, and the silicone rubber measured for specific gravity, hardness and heat resistance. The results are shown in Table 1.

Comparative Example 1

The 2 mm sheet which was press cured in Example 1, but not post cured was measured for specific gravity and hardness as initial values. The sheet was subjected to the heat resistance test as in Example 1. The results are shown in Table 2.

Comparative Example 2

The 2 mm sheet which was press cured in Example 2, but not post cured was measured for specific gravity and hardness as initial values. The sheet was subjected to the heat resistance test as in Example 1. The results are shown in Table 2.

Comparative Example 3

The 2 mm sheet which was press cured in Example 3, but not post cured was measured for specific gravity and hardness as initial values. The sheet was subjected to the heat resistance test as in Example 1. The results are shown in Table 2.

Comparative Example 4

The 2 mm sheet which was press cured in Example 4, but not post cured was measured for specific gravity and hardness as initial values. The sheet was subjected to the heat resistance test as in Example 1. The results are shown in Table 2.

Comparative Example 5

The 2 mm sheet which was press cured in Example 5, but not post cured was measured for specific gravity and hardness as initial values. The sheet was subjected to the heat resistance test as in Example 1. The results are shown in Table 2.

Comparative Example 6

The 2 mm sheet which was press cured in Example 6, but not post cured was measured for specific gravity and hardness as initial values. The sheet was subjected to the heat resistance test as in Example 1. The results are shown in Table 2.

Comparative Example 7

The 2 mm sheet which was press cured in Example 1 was post cured in an oven at 130° C. for 4 hours and measured for specific gravity and hardness as initial values. The sheet was subjected to the heat resistance test as in Example 1. The results are shown in Table 3.

TABLE 1

|  |  | Example 1 | | Example 2 | | Example 3 | | Example 4 | | Example 5 | | Example 6 | |
| --- | --- | --- | --- | --- | --- | --- | --- | --- | --- | --- | --- | --- | --- |
|  |  | Specific gravity | Hardness | Specific gravity | Hardness | Specific gravity | Hardness | Specific gravity | Hardness | Specific gravity | Hardness | Specific gravity | Hardness |
| Initial |  | 0.76 | 31 | 0.79 | 25 | 0.61 | 31 | 0.57 | 20 | 0.66 | 32 | 0.55 | 23 |
| Heat | 2 hr | 0.80 | 30 | 0.80 | 25 | 0.61 | 31 | 0.57 | 20 | 0.66 | 32 | 0.57 | 23 |
| resist- | 10 hr | 0.81 | 30 | 0.82 | 24 | 0.62 | 29 | 0.57 | 20 | 0.66 | 32 | 0.58 | 22 |
| ance | 30 hr | 0.83 | 29 | 0.83 | 23 | 0.64 | 29 | 0.58 | 19 | 0.67 | 32 | 0.60 | 22 |
| (200° C.) | 100 hr | 0.85 | 28 | 0.86 | 23 | 0.67 | 28 | 0.59 | 18 | 0.67 | 31 | 0.61 | 20 |

TABLE 2

| | | Comparative Example 1 | | Comparative Example 2 | | Comparative Example 3 | | Comparative Example 4 | | Comparative Example 5 | | Comparative Example 6 | |
|---|---|---|---|---|---|---|---|---|---|---|---|---|---|
| | | Specific gravity | Hardness | Specific gravity | Hardness | Specific gravity | Hardness | Specific gravity | Hardness | Specific gravity | Hardness | Specific gravity | Hardness |
| Initial | | 0.71 | 35 | 0.72 | 29 | 0.50 | 36 | 0.48 | 24 | 0.48 | 36 | 0.47 | 28 |
| Heat resistance (200° C.) | 2 hr | 0.78 | 31 | 0.80 | 25 | 0.61 | 31 | 0.61 | 20 | 0.57 | 32 | 0.55 | 23 |
| | 10 hr | 0.80 | 30 | 0.81 | 23 | 0.62 | 30 | 0.62 | 19 | 0.57 | 32 | 0.57 | 22 |
| | 30 hr | 0.82 | 29 | 0.82 | 23 | 0.64 | 29 | 0.64 | 19 | 0.59 | 31 | 0.59 | 21 |
| | 100 hr | 0.84 | 28 | 0.85 | 22 | 0.67 | 28 | 0.67 | 18 | 0.59 | 31 | 0.61 | 21 |

TABLE 3

| | | Comparative Example 7 | |
|---|---|---|---|
| | | Specific gravity | Hardness |
| Initial | | 0.72 | 35 |
| Heat resistance (200° C.) | 2 hr | 0.79 | 31 |
| | 10 hr | 0.81 | 30 |
| | 30 hr | 0.83 | 30 |
| | 100 hr | 0.85 | 29 |

As seen from Tables 1 to 3, the cured silicone rubber samples in Examples 1 to 6 showed little or no changes of specific gravity and hardness over the period from the initial after post curing to 100 hours of the heat resistance test. In contrast, the cured silicone rubber samples in Comparative Examples 1 to 7 showed marked changes of specific gravity and hardness even after 2 hours of the heat resistance test.

Figure 2:
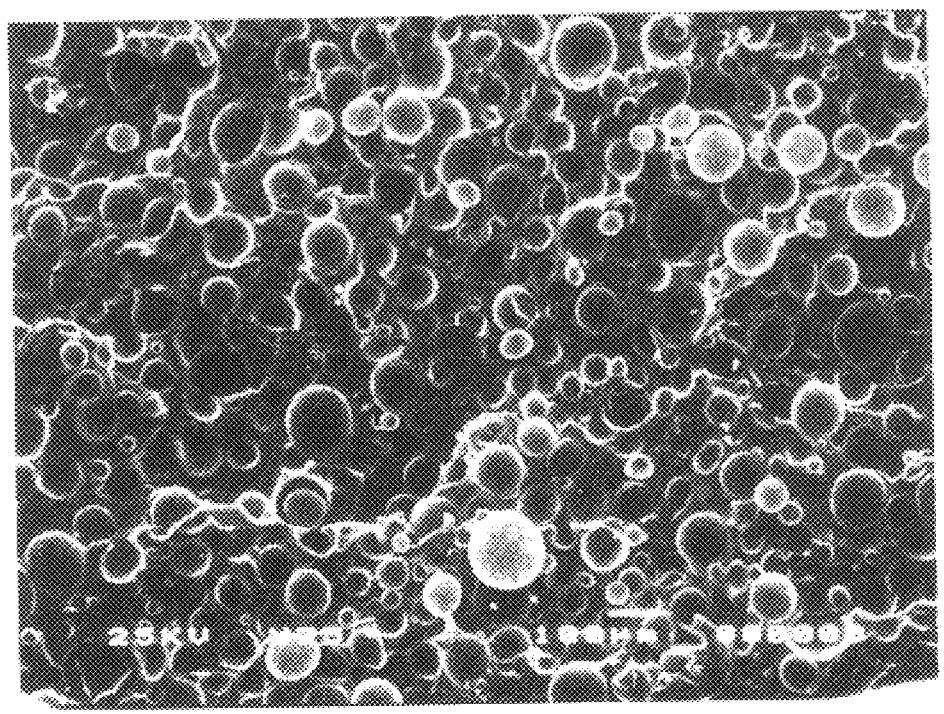
FIG. 2 is a photomicrograph of the silicone rubber sample after press curing or primary molding in Comparative Example 2.

FIGS. 1 and 2 are photomicrographs (magnification X75) of the sample of Example 2 after post curing and the sample of Comparative Example 2 after primary molding or press curing. It is evident that the hollow filler kept before post curing is broken after post curing.

Example 7

With 0.1 part of a platinum catalyst (Pt concentration 1%) added, the silicone rubber composition obtained in Example 1 was pressed cured at a molding pressure of 8 N/mm² and 160° C. for 10 minutes into a sheet of 2 mm thick. It was post cured in an oven at 200° C. for 2 hours. The sheet was measured for specific gravity and hardness as initial values. The sheet was examined for heat resistance as in Example 1. The results are shown in Table 4.

Comparative Example 8

With 0.1 part of a platinum catalyst (Pt concentration 1%) added, the silicone rubber composition obtained in Example 1 was pressed cured at a molding pressure of 8 N/mm² and 200° C. for 15 minutes into a sheet of 2 mm thick. It was post cured in an oven at 200° C. for 2 hours. The sheet was measured for specific gravity and hardness as initial values. The sheet was examined for heat resistance as in Example 1. The results are shown in Table 4. It is understood that the sheet of Comparative Example 8 was not a low specific gravity rubber elastomer since the balloons were already broken in the primary molding step,

TABLE 4

| | | Example 7 | | Comparative Example 8 | |
|---|---|---|---|---|---|
| | | Specific gravity | Hardness | Specific gravity | Hardness |
| Initial | | 0.79 | 31 | 0.92 | 34 |
| Heat resistance (200° C.) | 2 hr | 0.80 | 31 | 0.92 | 33 |
| | 10 hr | 0.82 | 30 | 0.93 | 33 |
| | 30 hr | 0.82 | 29 | 0.93 | 33 |
| | 100 hr | 0.83 | 29 | 0.94 | 32 |

There has been described the method capable of manufacturing a low specific gravity silicone rubber elastomer having improved heat resistance and minimized changes with time of physical properties in a simple manner without operational problems.

Japanese Patent Application No. 2000-052917 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing a low specific gravity silicone rubber elastomer, comprising the steps of:

molding a heat curable silicone rubber composition containing a hollow filler of organic resin at a temperature that is less than 20° C. higher than the softening point of the organic resin, provided that when said temperature is not below the softening point of the organic resin, molding is effected for a period of time such that the hollow filler is not broken, and secondarily curing the molded rubber at a temperature that is equal to or higher than the softening point of the organic resin for a period of time such that the hollow filler is broken.

2. The method of claim 1 wherein the molding step is effected at a temperature below the softening point of the organic resin, and the secondary curing step is effected at a temperature not lower than the softening point of the organic resin.

3. The method of claim 1 wherein the molding step is effected within 14 minutes at a temperature from the softening point of the organic resin to the softening point plus 20° C., and the secondary curing step is effected for at least 15 minutes at a temperature not lower than the softening point of the organic resin.

4. The method of claim 1 wherein the hollow filler of organic resin has a mean particle size of up to 200 μm and is present in an amount of 0.1 to 20 parts by weight per 100 parts by weight of the composition.

5. The method of claim 1 wherein said hollow filler of organic resin has a specific gravity of 0.01 to 0.5 and a mean particle size of 10 to 200 μm.

6. The method of claim 1 wherein said heat curable silicone rubber composition is an organopolysiloxane composition comprising 100 parts by weight of an organopolysiloxane having at least two alkenyl groups attached to silicon atoms in a molecule, 0.1 to 50 parts by weight of an organohydrogenpolysiloxane having at least two hydrogen atoms attached to silicon atoms in a molecule, and a catalytic amount of an addition reaction catalyst or an organopolysiloxane composition comprising 100 parts by weight of an organopolysiloxane having at least two alkenyl groups attached to silicon atoms in a molecule and a catalytic amount of an organic peroxide.

7. The method of claim 6 wherein the organopolysiloxane composition comprises (1) 100 parts by weight of an organopolysiloxane having at least two alkenyl groups attached to silicon atoms in a molecule, (2) 0.1 to 50 parts by weight of an organohydrogenpolysiloxane having at least two hydrogen atoms attached to silicon atoms in a molecule, and (3) a catalytic amount of an addition reaction catalyst.

8. The method of claim 6 wherein the organopolysiloxane composition comprises (i) 100 parts by weight of an organopolysiloxane having at least two alkenyl groups attached to silicon atoms in a molecule, and (ii) a catalytic amount of an organic peroxide.

9. The method of claim 1 wherein the organic resin of the filler is a polymer of a monomer or a copolymer of at least two monomers selected from the group consisting of vinylidene chloride, acrylonitrile, methacrylonitrile, acrylates, and mechacrylates.

10. The method of claim 1 wherein the organic resin of the hollow filler has a softening point in the range of 100 to 200° C.

11. The method of claim 1 wherein, when said temperature is not below the softening point of the organic resin, molding is effected within 14 minutes.

12. The method of claim 1 wherein the molding step is effected within 10 seconds to 10 minutes.

13. The method of claim 1 wherein the molding time is from about 10 seconds to about 30 minutes.

* * * * *